May 8, 1951 F. G. NICOLAUS 2,551,692

REGISTER DEVICE WITH SPIRAL NUMBER DISPLAY

Filed Oct. 19, 1946 2 Sheets-Sheet 1

Inventor:-
Frank G. Nicolaus.
By Callard Livingston
Attorney.

REGISTER DEVICE WITH SPIRAL NUMBER DISPLAY

Filed Oct. 19, 1946 2 Sheets-Sheet 2

Inventor:-
Frank G. Nicolaus.
By [signature]
Attorney.

Patented May 8, 1951 2,551,692

UNITED STATES PATENT OFFICE 2,551,692

REGISTER DEVICE WITH SPIRAL NUMBER DISPLAY

Frank G. Nicolaus, Chicago, Ill., assignor to Raymond T. Moloney, Chicago, Ill.

Application October 19, 1946, Serial No. 704,453

13 Claims. (Cl. 235—107)

This invention pertains to totalizing and registering devices, particularly those types employing a rotary or cyclically moving indicator member or indicia-bearing member.

The principal object of the invention is the provision of means for extending the indicating range or capacity of such devices through the medium of shiftable mechanism cooperating with the registering or indicia means such that part of the register indicia is masked during part of the cyclic movement of the indicia or indicating member, to be rendered visible or effective for indicating purposes, automatically, for that part of the motion of said indicia member subsequent to travel through the aforesaid part of its cyclic movement.

Certain types of totalizer or register device employ a rotated disc having radially disposed or peripherally spaced indicating characters, such as numbers, thereon and which are presented to view or registering position in step by step or analogous rotational movements of the disc, and when such a disc has completed one revolution, a continuation of its rotary motion will merely repeat the previous presentation of indicating characters, so that the indicating range of such an arrangement may be said to amount to the maximum number of characters that can be crowded into one complete revolution or cycle of movement thereof.

If, by way of example, digits from 1 to 100 are arranged on a rotary disc in three concentric, circumferential rows, so as to be presented in succession at a reading or reference point by unidirectional movement of the disc, then the numbers from 1 to 100 will appear in succession during each revolution of the disc, but when the number 100 is reached, continued rotation of the disc will repeat the previous succession of digits beginning with 1 again. Such concentric, circumferential arrangement of digits is that commonly employed in prior devices of this class.

By arranging the digits in a certain spiral configuration hereinafter to be explained, and utilizing certain novel shutter or control mechanism likewise to be explained, this invention makes possible the use of a rotary indicator or register disc which can make more than a single revolution before repeating, and which has an extended indicia range.

In addition to the provision of a novel configuration of indicating characters on a rotary carrier or the like, the invention provides a novel shutter means, a novel shutter actuating and control means, and novel means for cooperatively adapting said shutter and control means to a known type of totalizer or register, all of which, together with ancillary objects and aspects of novelty, will appear as the following description proceeds in view of the annexed drawings, in which.

Figure 1:
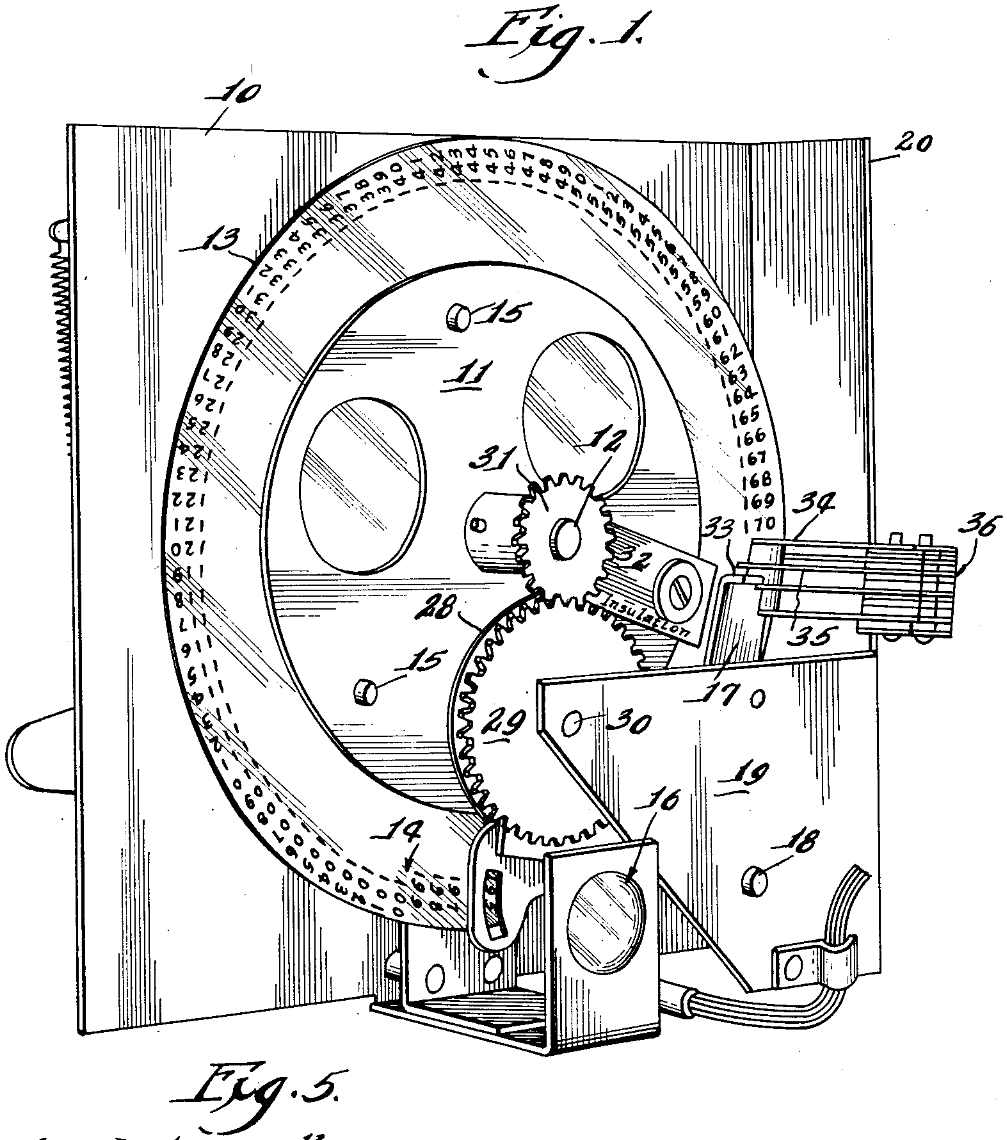
Fig. 1 is a rear perspective view of a score register utilizing the novel, spirally numbered disc and shutter means.

In Fig. 1 there is shown an adaptation of the invention to a score register or totalizer of a type used in conjunction with amusement games, this form of device having a main mounting plate 10 on which is journaled a circular plate 11 adapted to rotate about axis 12.

On the opposite side of the main plate 10 (not shown) are situated various electromagnetic stepping mechanisms for effectuating a step-by-step unidirectional advance of the circular plate 11; however, since such mechanisms do not per se constitute part of the present invention, they are not shown herein, it being sufficient for purposes of this disclosure to state that said circular plate 11 and its axle pin 12 are advanced rotatively in the intended operation of the register device, and are further intended to be returned in direction opposite to the advance thereof to a normal starting position after disc or plate 11 has made, in this embodiment, two revolutions, or less, depending upon the score to be registered.

One form of stepping mechanism suitable for use with plate 11, as aforesaid, is shown in U. S. Patent No. 2,281,262 to Breitenstein.

Indicating means includes a circular transparency 13 having an opaque area 14 in which are indicia characters or numbers arranged to read from 100 to 199 in a circumferential sense about the transparency, a further peculiarity of this arrangement residing in the fact that the radial distance of the digits making up these numbers diminishes slightly in the direction of the higher numbers, so that the arrangement of indicia characters or numbers may be said to be spiral with regard to the center of rotation about pin 12, such spiral displacement being most apparent in Fig. 1 at 14. The transparency 13 may be attached to plate 11 in any desired manner; in the present embodiment, plate 11 has a companion plate (not seen) secured thereto by screws 15, and the transparency 13 is clamped between said plates.

Light from a small but brilliant lamp (not shown) is projected from behind plate 10 through an opening therein aligned with projecting lens 16, so that the image of whichever indicia character or number is in registering position relative to said lens will be projected upon a suitable screen or ground glass plate for ready visibility to the player of the game or the like. Similar projecting features are disclosed in the aforesaid Patent No. 2,281,262.

Means acting cooperatively with movements of the indicia carrier for determining which of the indicia characters shall be in projecting position or condition during any first or subsequent revolution of said carrier, and for controlling certain circuit devices, includes (Fig. 2) a dog-leg lever 17 pivoted on pin 18 seated in plate 19 (Fig. 1) on upset edge portion 20 of the main plate 10.

Lever 17 has an enlarged end portion in which is punched a short arcuate slot or window 21 through which some or all of the digits in any given set or number on the transparency may be projected, depending upon the positions of said lever, as will appear.

The shutter and control lever 17 is normally urged in a clockwise direction by spring 22 connected to pin 23 and plate 19, but this movement is limited by a cam roller 24 on arm 25 secured to said lever as at 26, 27, said cam roller engaging the edge of control cam 28, which is ring-staked to a large gear 29, said cam and gear unit rotating on stud 30 in plate 19.

Cam gear 29 meshes with pinion 31 on the indicator disc axle stud 12, said pinion being fast on said stud 12 to turn with the disc, and the ratio between pinion 31 and cam gear 29 being, in this instance 2:1, so that the indicator disc or transparency 13 and circular plate 11, will make two revolutions in effect, to one of cam 28.

Figure 2:
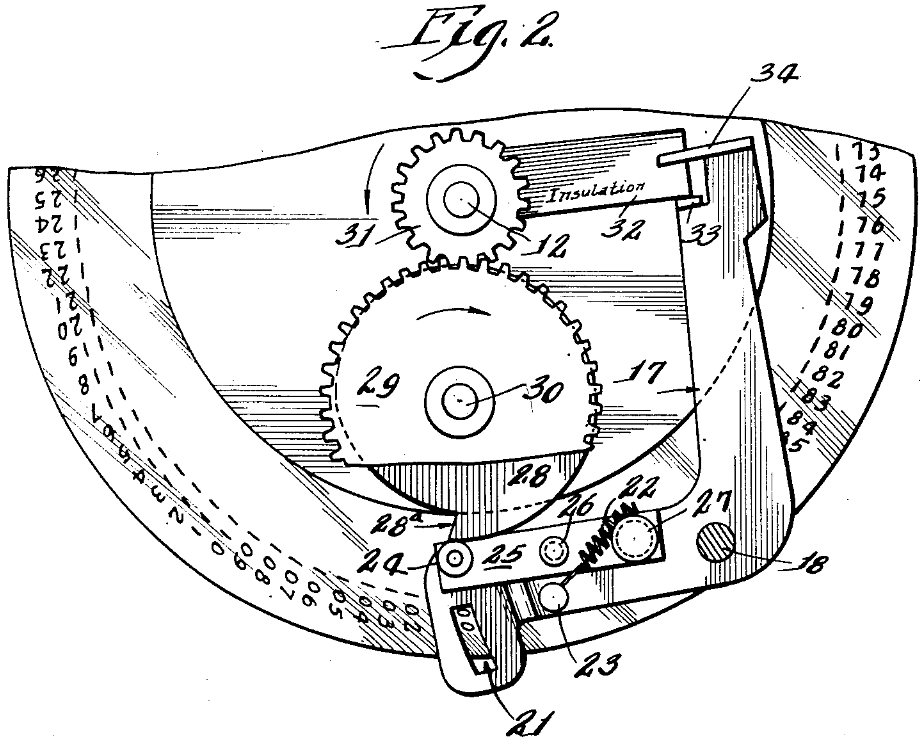
Fig. 2 is a rear elevational fragment of said disc with parts of the shutter control and actuating mechanism revealed by removal of a mounting plate.

The zeroized or starting position of the indicator or register is as shown in Fig. 2, wherein it will be observed that the indicia characters "00" are in register with the shutter window 21, cam roller 24 being at the highest point of the cam periphery, in which condition, a stop arm 32, fast on the indicator disc stud 12 bears against a stopping offset 33 on the end of the dog-leg lever 17 opposite from the shutter end thereof.

Figure 3:
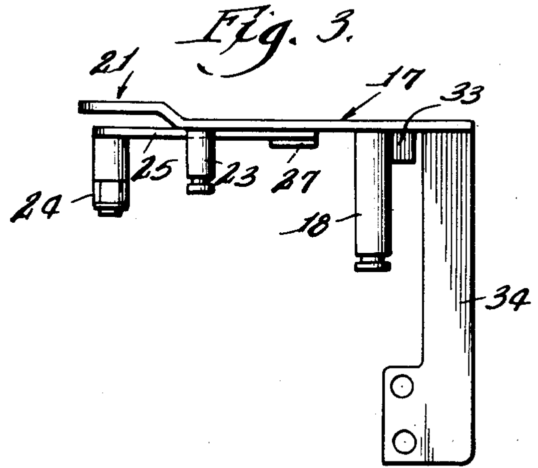
Fig. 3 is a top plan view of the control switch mount and shutter means.
Figure 4:
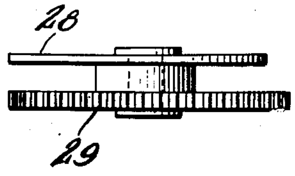
Fig. 4 is a top plan view (edgewise) of the main driving gear and control cam.

As shown in Fig. 3, the upper end of the dog-leg lever 17 includes, in addition to the stopping offset 33, a further switch-carrying offset 34, upon which is mounted, as in Fig. 1, a leafspring type of switch having at least one operating blade 35 projecting into the path of the end of stop arm 32 above the stopping offset 33, such that when the indicator disc is in normal, zeroized position, the end of stop arm 32 will bear down on said switch blade 35 and depress the latter against offset 33, thereby operating control switch means 36, and also limiting the return or normalizing motion of the indicator disc in a clockwise direction.

The development of cam 28 is such that when the indicator disc assembly has made one revolution, shutter window 21 will have been permitted to shift gradually inward by gradual clockwise rocking of lever 17, at which time the opposite end portions of this lever, including the stopping offset and switch means will have been displaced out of the path of the end of stop arm 32, so that the indicator disc may continue in a second revolution.

During the first revolution of the indicator disc assembly, the position of the shutter window 21 is such that only the numbers "00" to "99" register therewith for projection in the manner aforesaid; but by the time the indicator disc has completed the first revolution, cam 28 will have made one-half revolution, and the consequent inward shifting of the shutter lever 17 will position window 21 substantially as in Fig. 1, so that all of the indicia characters or numbers in any (radial) group will be in register and position for projecting.

Thus, during the first revolution of the indicator disc, only two-digit numbers will be projectable, but during the second revolution of said disc, three-digits will be projectable, including the numbers from "99" to "199."

In the type of score register shown for illustrative purposes, it is customary to restore the indicator disc to normal, zeroized condition by spring means tensioned during the advancing movements thereof, as by electromagnetic release of a holding pawl (not shown). In Figs. 1 and 2, the advancing or indicating rotation of the indicator disc assembly is counterclockwise, and the normalizing return motion is intended to be clockwise, so that stop arm 32 will bear against the stopping offset and switch parts 33, 35, as aforesaid, when the indicator disc has made the necessary return travel, cam 28 rocking the lever means 17 in a counterclockwise direction during this return travel, cooperatively with spring 22, so that said parts 33 and 35 will be in position for engagement by the end of stop arm 32 when the disc assembly reaches its normal, zero, starting position.

Figure 5:
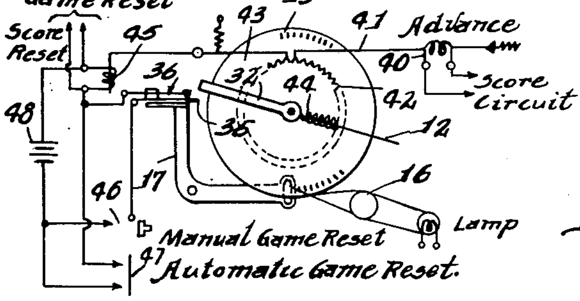
Fig. 5 is a circuit diagram particularly illustrative of certain shutter switch control means.

It is to be understood that the switch means 36 is adapted for connection to control any desired circuits associated with the indicating apparatus, as for example in the arrangement shown schematically in Fig. 5, wherein the indicator disc 13 is advanced by energizations of coil 40 from a score control circuit, this coil moving a conventional pawl means 41 engaging ratchet teeth 42 fast with the axle stud 12, and a conventional holding pawl means 43 preventing retrograde motion of the disc by return spring 44 until such time as the holding pawl 43 is withdrawn from the ratchet teeth by energization of a rest coil 45 responsive to manual operation of switch 46 or automatic reset switch means 47.

In the case where the reset coil is to be energized by operation of the manual reset switch 46, it is to be observed that the energizing circuit from battery or power source 48 goes through the shutter switch means 36, which must be closed at the time manual switch 46 is closed if coil 45 is to be energized; however, shutter switch means 36 is closed only when the stop arm 32 is away from normal, zero or starting position, whereas the automatic reset switch means 47 may be operated independently of the manual switch means and shutter switch means 36.

Other control circuit arrangements utilizing the shutter switch means 36 are possible, and it will occur to those skilled in the art that the indicating range of the illustrative embodiment may be expanded by modification of the spiral offset of the indicia characters and correspondingly changing the development of the cam means 28 to effectuate the necessary movements of the shutter means responsive to rotative movements of the disc assembly beyond two revolutions.

In the interest of accuracy, it is pointed out that the disc assembly of the illustrative embodiment herein does not quite complete the second revolution, the disc 13 actually being arrested when the numbers "195" register, as in Fig. 1; and this occurs because the cam roller 24 abuts the drop in the cam periphery as indicated at 28A, Fig. 2. It will be apparent, however that spiral undercutting of this portion of the cam will easily permit completion of the full second cycle or revolution should this be desirable.

In conjunction with the cam roller mounting member 25, attention is also called to the fact that the screw 26 is preferably threaded into a tapped hole in the dog-leg or shutter lever 17, while the hole for this screw through member 25 is made oversize, whereby to permit slight pivotal adjustment of member 25 relative to pivot pin 27 before tightening screw 26, in order that slight justification of the shutter position may be made relative to the spiral offsetting of the indicia characters.

It is the intention that the scope of the invention and improvements originating with this disclosure shall not be limited to the precise structural and functional details shown excepting as may be required by valid and fair interpretation of the appended claims.

I claim:

1. In a register device of the class described, a rotatable carrier, indicia characters in groups about the rotative center of the carrier, each said group containing a plurality of characters spaced apart in a radial sense from and relative to said center to be read radially outward therefrom, the radial spacing of the characters in said groups diminishing in a progressively spiral sense from a first group of characters about said center, a shutter including an approximately radially movable portion adapted to be moved from a starting position in which less than all of the characters in any said group are effectively readable to advanced positions in which all of the characters in any said group are effectively readable, and mechanism actuated corelatively with rotative motion of the carrier for moving said shutter between and into said starting and advanced positions for the purpose aforesaid.

2. In a register device of the class described, a rotatable carrier having a plurality of circumambiently extensive columns of indicia characters about said carrier to provide radial groups of indicia characters with the constituent characters of each said group spaced apart in a radial sense outwardly from the rotative center of the carrier, the radial spacing of the characters in said columns diminishing in a predetermined spiral progression relative to said center from a first one of said groups about said center toward a last one of said groups, together with shutter means movable from a first position radially of said center in which less than all of the characters of a said group are exposed thereby, to an advanced position relative to said center in which all of the characters in said groups are exposed thereby, and means corelating the movements of said shutter means to and from said first position thereof with rotative movements of said carrier, whereby the number of characters exposed in any said group is a function of the number of revolutions of said carrier.

3. In a device of the class described, a revoluble member having indicia characters thereon, said characters so arranged that there are a plurality of approximately radially extensive groups of characters about the rotative center of said member, there being a plurality of characters in each group and the characters of said groups being readable in a radial direction and spirally offset relative to said center, a shutter member including a window portion movable approximately radially of said center between limiting positions to obscure or expose certain characters in any group positioned in indicating alignment therewith, means drivingly interconnecting the revoluble member and said shutter member and effecting movements of the latter between said limiting positions responsive to rotational displacements of the revoluble member.

4. In a totalizer or the like, a revoluble disc, a shutter movable back and forth approximately radially of the rotative center of said disc, means yieldingly urging said shutter in one direction, cam means limiting movement of the shutter in said one direction and including rotatable cam portions effective to move said shutter in an opposite direction to a starting position responsive to rotative displacement of the cam portions in a first direction a certain angular distance, and said cam portions effective to permit movement of said shutter in said one direction of movement thereof responsive to angular displacement of said cam portions in a second direction opposite to said first direction of angular movement thereof, means drivingly interconnecting said disc and cam portions to effect angular displacements of the latter responsive to rotation of the disc, and spirally offset indicating numbers in radially extensive groups on said disc, said shutter adapted to obscure certain numbers in any group or expose all numbers in any group depending upon its position as determined by said cam means responsive to angular movements of the disc.

5. In a score register device, an indicator disc mounted to rotate and having a plurality of circumambiently extensive columns of digits disposed in spiral concentricity to the rotative center of said disc such that the digits of said columns read radially in radial groups, the numerical value of the groups increasing consecutively from a starting group thence around the disc, a shutter device pivoted for movement in a plane parallel to that of the disc and having a window portion adapted to be in alignment with any said digit group depending upon the degree of rotative displacement of the disc from a starting position corresponding to said starting group, said window portion adapted to expose all or less than all of the digits in any said group aligned therewith depending upon the angular position of said shutter device, and mechanism operating dependently upon rotative movements of said disc for pivoting said shutter device, whereby the latter will assume different angular positions depending upon the revoluble displacement of the disc from starting position as aforesaid.

6. The invention defined in claim 5 further characterized by the provision of a stop member movable angularly with said disc, and stop extension positioned by said shutter device and engaged by said stop member to limit the movement of the disc from an advanced position in retrogression to said starting position.

7. The invention defined in claim 5 and further characterized by the provision of a control switch moved by said shutter device, and a member movable with said disc to operatively engage and actuate said switch when the disc is in starting position, said switch moved out of position for operative engagement by said movable member responsive to pivotal movement of the shutter device occurring as a result of a predetermined angular movement of the disc from starting position.

8. A score register device including a rotatable disc, a shutter including a dog-leg lever pivoted in axial parallelism with the disc axis, a shutter window in one leg of said lever, control means on the other leg of said lever, a cam rotated in reduced ratio to rotative movement of the disc, spring means normally urging said dog-leg lever to dispose said window inwardly toward the disc axis, cam rider means on said lever engaging said cam, the latter in one angular position corresponding to a starting position of said disc, urging said shutter outwardly to an initial position, indicia characters on said disc about the axis thereof and spirally offset relative to the said axis, said characters for any given position of angular displacement of the disc being wholly or partly exposed by said shutter window depending upon the amount of rotation of the disc away from said starting position, said disc being adapted to rotate in one direction from starting position in indicating operation, and to be restored to starting position by retrograde motion, and means moving angularly with said disc and operatively engaging said control means on the dog-leg lever when the disc is in starting position and missing operative engagement with the control means when the disc is rotated beyond a predetermined degree of angular displacement from starting position.

9. In a register device, a rotatable carrier having groups of numbers, each consisting of a plurality of digits, extending in sequence around the rotating center thereof, the digits in each number group being spaced relative to each other approximately radially of said center, a shutter mounted for movement adjacent said carrier and having a window displaced in an approximately radial travel responsive to movement of the shutter so as to mask one or more digits in each said number group depending upon the position of the shutter, and means for moving the shutter cooperatively with the rotation of said carrier in a ratio which will cause a different number of digits in any said number group to be exposed during successive cycles of rotation of said carrier.

10. In a register device, a rotatable carrier having a continuous sequence of number groups about its rotative center, each said group consisting of at least three digits inclusive of zeros and said digits appearing in a radial reading order in each group, a pivoted shutter adjacent the carrier with a window disposed to travel in a radial sense over the digits of a said number group aligned therewith so as to expose a desired number of digits in said number, and means drivingly coacting with said carrier for pivoting said shutter to different digit-exposing positions in successive revolutions of the carrier.

11. In a register device, a rotatable disc, indicia groups arranged in sequence around the rotating center of said disc, each said group consisting of at least two characters, said characters being readable in a radial sense, a shutter movable to mask or expose one or more characters in any said group positioned therebefore, and cam and pinion means driven rotatively with said disc and cooperable with said shutter for effecting a change of position of said shutter as a function of successive revolutions of the disc such that the number of characters readable in a group during one said revolution shall be different from the number readable during the succeeding revolution.

12. Register means as defined in claim 11 and further characterized by the provision of stop means rotatively positioned with said cam and pinion means relative to a starting position of said disc for determining a corresponding position of said shutter.

13. In a register device of the known type having a number dial and a movable shutter for masking or exposing numbers on said dial, improvements for expanding the range of numbers on said dial and comprising the following, to wit: A number dial on which there are arranged about a center of rotation for the dial, groups of numbers each containing a plurality of digits, the digits in any group being readable radially, that is to say, in a sense from the center of the dial outwardly, the numerical value of the total number represented by any group increasing in a predetermined circumferential direction around said center from a predetermined minimum to a maximum value, said dial being adapted for use with a shutter movable in a radial sense across any of said groups to mask one or more of the digits thereof, the digits of said groups being offset in a radial direction beginning with the said group representing the minimum value and progressing spirally inwardly with the succeeding groups.

FRANK G. NICOLAUS.

REFERENCES CITED

The following references are of record in the file of this patent:

UNITED STATES PATENTS

| Number | Name | Date |
|---|---|---|
| 1,156,438 | Simpson | Oct. 12, 1915 |
| 1,705,164 | Wheeler | Mar. 12, 1929 |
| 2,060,674 | Hicks | Nov. 10, 1936 |
| 2,361,572 | Smith | Oct. 31, 1944 |